US005113423A

United States Patent [19]

Csonka

[11] Patent Number: 5,113,423

[45] Date of Patent: May 12, 1992

[54] APPARATUS AND METHOD FOR IMPROVING RADIATION COHERENCE AND REDUCING BEAM EMITTANCE

[76] Inventor: Paul L. Csonka, 105 E. 39th Ave., Eugene, Oreg. 97405

[21] Appl. No.: 260,347

[22] Filed: Oct. 20, 1988

[51] Int. Cl.[5] .......................... G21K 1/06; G21K 1/00; H01S 3/30

[52] U.S. Cl. ...................................... 378/145; 378/84; 378/85; 372/5

[58] Field of Search .................. 378/84, 85, 145, 146, 378/160, 149; 372/5

[56] References Cited

U.S. PATENT DOCUMENTS

| | | | |
|---|---|---|---|
| 3,980,883 | 9/1976 | Franks | 378/84 |
| 4,260,898 | 4/1981 | Annis | 378/146 |
| 4,342,914 | 8/1982 | Bjorkholm | 378/146 |
| 4,395,775 | 7/1983 | Roberts et al. | 378/145 |
| 4,429,411 | 1/1984 | Smither | 378/145 |
| 4,698,833 | 10/1987 | Keem et al. | 378/85 |
| 4,773,087 | 9/1988 | Plewes | 378/160 |
| 4,788,698 | 11/1988 | Kimura et al. | 378/145 |

OTHER PUBLICATIONS

"Equitemporal X-Ray Optics" by Csonka 1986.

*Primary Examiner*—Edward P. Westin
*Assistant Examiner*—Kim-Kwok Chu
*Attorney, Agent, or Firm*—Edward V. Hiskes; Robert Southworth; William R. Moser

[57] ABSTRACT

A method and apparatus for increasing the coherence and reducing the emittance of a beam-shaped pulse operates by splitting the pulse into multiple sub-beams, delaying the propagation of the various sub-beams by varying amounts, and then recombining the sub-beams by means of a rotating optical element to form a pulse of longer duration with improved transverse coherence.

4 Claims, 5 Drawing Sheets

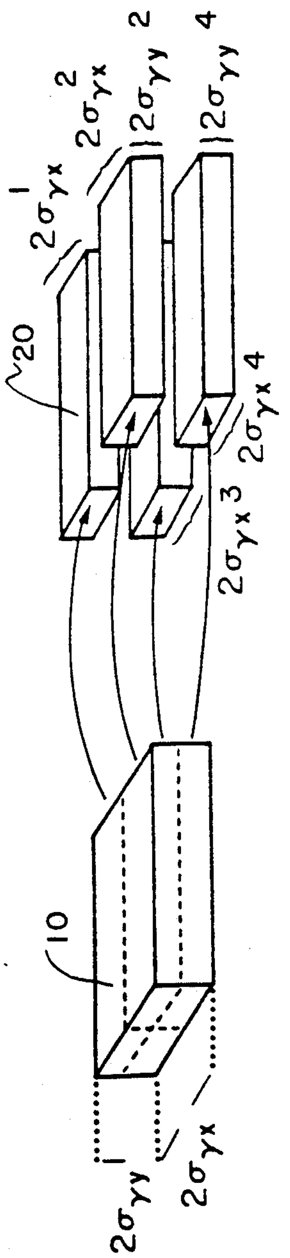
FIG.1a
FIG.1b
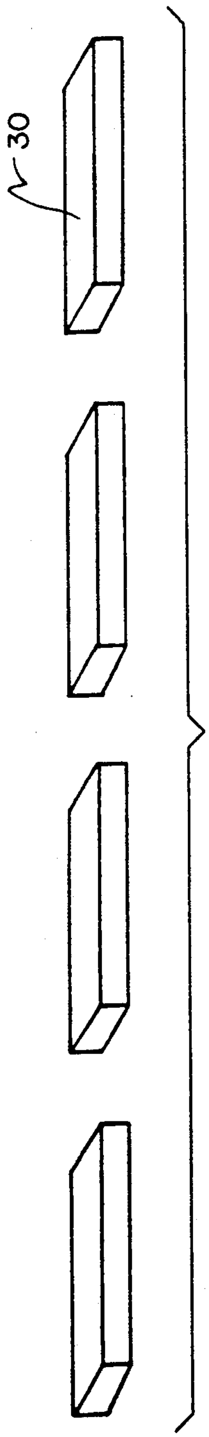
FIG.2
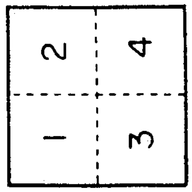
FIG.3
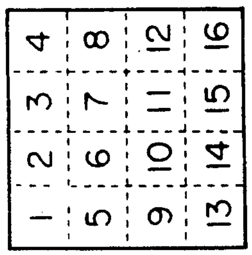
FIG.4
FIG.5

APPARATUS AND METHOD FOR IMPROVING RADIATION COHERENCE AND REDUCING BEAM EMITTANCE

GOVERNMENT CONTRACT

This invention was made in the course of or under a contract with the United States Department of Energy, Contract No. DE-FG06-85-ER-13309.

BACKGROUND OF THE INVENTION

This invention relates in general to devices which emit radiation, and in particular to a device which improves the coherence of radiation from a partially coherent source, particularly an x-ray source. It is currently difficult and expensive to generate coherent x-rays using laser techniques. Accordingly, when coherent x-rays are required for interference experiments and the like, it is typical to employ a source of partially coherent x-rays followed by slits which filter out non-coherent portions of the beam. But this technique for improving coherence has a disadvantage: the slits permit only a fraction of the total beam energy to pass to the exit port. This inefficiency results in longer experiment times, and increased expense, and when the signal to noise ratio is too low, it may inhibit the experiment altogether.

In the process of increasing the transverse coherence of a radiation beam pulse by the method of this invention, the emittance of the beam is being reduced along at least one transverse direction. "Transverse direction" is defined here as one which is perpendicular to the direction of propagation of the beam. That reduction can be useful even if the beam is not to be used for interference experiments, for example, when it is desired to compress the length of the original beam pulse, i.e. to have substantially all of the radiation impinge on a surface during a time, $\delta t$, shorter than the original time duration of the pulse. That can be accomplished by dynamical optical means and the smallest achievable $\delta t$ depends on the transverse emittance of the beam pulse. A reduction of the transverse emittance along at least one direction will, therefore, allow one to achieve smaller $\delta t$ values.

OBJECT OF THE INVENTION

Thus, it is an object of this invention to provide an apparatus and method for improving the coherence of a beam of radiation in a manner such that efficient use is made of the total beam energy of a partially coherent source. An added benefit, is that the length of the resultant radiation beam pulse can be compressed more readily by dynamical means, than the original beam pulse could be.

The method can be applied not only to electromagnetic radiation beams, but also to beams of other types of particles.

SUMMARY OF THE INVENTION

A partially coherent beam-shaped pulse of particles (referred to in the following as x-rays) is sectioned longitudinally into numerous beam-shaped pulses of smaller cross section. The diameter of these smaller beams more closely approaches the transverse coherence length desired in a particular experiment. The various beams are guided along separate paths which have different lengths in order to delay each pulse by a different period of time. The delayed pulses are then directed toward a rotating mirror which deflects them all along the same path, one after another. In this manner, a relatively wide and short beam-shaped pulse with poor transverse coherence is converted into a long, narrow pulse with good transverse coherence.

BRIEF DESCRIPTION OF THE DRAWINGS

FIG. 1(*a*) is a schematic view of a beam pulse before being split longitudinally into pulses with smaller cross section.

FIG. 1(*b*) is a view of one of these pulses of smaller cross section.

FIG. 2 is a schematic showing the serial arrangement of the beam pulses after they have been delayed and serially re-directed by the rotating mirror.

FIGS. 3, 4 and 5 illustrate various plans for longitudinal section of the beam suitable for use in the apparatus.

DESCRIPTION OF THE PREFERRED EMBODIMENT

FIGS. 1 and 2 illustrate the principle of the invention. In FIG. 1, wide, beam-shaped pulse 10 of partially coherent x-rays is shown being longitudinally sectioned into a group of narrower pulses, 20. The photons contained in pulse 10 have a certain degree of coherence transverse to the length of the pulse, but this coherence does not extend over the entire cross section of the pulse. In other words, along at least one direction, the transverse coherence length of the radiation is less than the width of pulse 10. After pulse 10 has been sectioned into a group of narrower pulses, 20, the transverse coherence length of each such pulse ore closely approaches the width of the pulses. Thus, the ratio of coherent radiation to total radiation is higher i.e. transverse coherence within each pulse has been improved.

FIG. 2 is a schematic depicting pulses 20 after they have been delayed by varying amounts of time and re-ordered in serial fashion into a single pulsed beam, designated as 30, according to the method taught herein. The result of this re-ordering is that wide, less-coherent pulse 10 has been transformed into narrow, more coherent beam 30. Beam 30, due to its improved transverse coherence, is more useful in, for example, experiments involving the generation of interference patterns. Ideally, beam 30 will capture all of the energy originally present in pulse 10.

FIGS. 3, 4 and 5 depict several schemes for sectioning pulse 10 into narrower pulses. The beam may be sectioned in either one or two dimensions. The number of sections required depends upon the application, with more sections being required for low-coherence input pulses. If required, the beam splitting process depicted in FIGS. 1-5 can be repeated in cascaded stages, with the split beams output from one stage being, in turn, split again in succeeding stages until the desired degree of width-narrowing is achieved.

Figure 6:
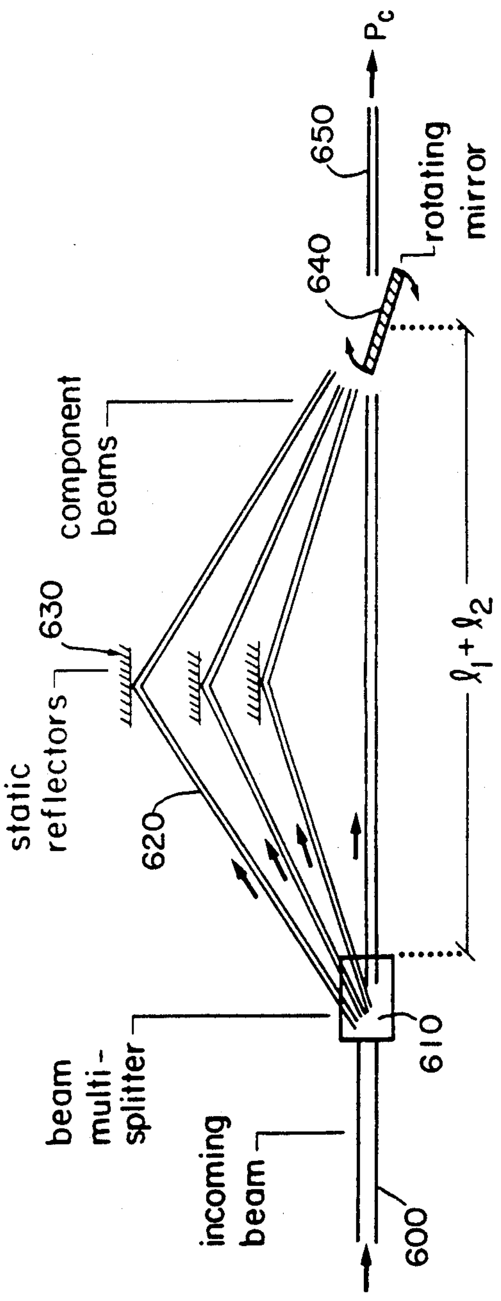
FIG. 6 is a schematic of an embodiment of the invention.

FIG. 6 is a schematic of a preferred embodiment of the invention. A pulse of input radiation is sent down beam pathway 600 to beam splitter 610. Split output pulses emerge from splitter 610 and pass via beam pathways 620 to a bank of static reflectors, designated collectively as 630, from whence the pulses are directed toward rotating mirror 640. The path lengths traveled from splitter 610 to mirror 640 are caused to be different for each beam pathway and reflector combination, such that only one pulse is arriving at mirror 640 at any given instant. The rotation speed of 640 and the angles of the beam tubes are adjusted such that each pulse arriving at the mirror is reflected into output light pathway 650.

Figure 7:
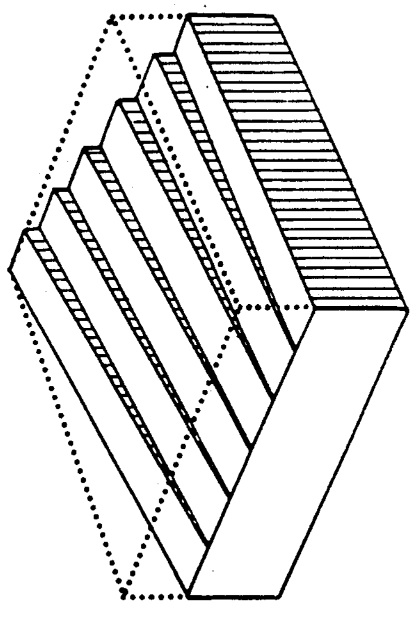
FIG. 7 is a perspective view of a beam splitter suitable for use with the invention.

FIG. 7 is a perspective view of a beam-splitter suitable for use in this invention.

Further construction details and theoretical background concerning this invention will now be presented.

In order that radiation in a beam be sufficiently coherent, it has to satisfy certain conditions. Such coherence can be characterized for simple beam geometries by the coherence length, $h_z$, of the beam and its two coherence diameters $h_x$ and $h_y$, along the x and y axes respectively (the z axis is chosen to be parallel to the direction of beam propagation).

If one requires that the coherence length, $h_z$, be longer than a specified length, $l_z$, then the beam must be sufficiently a) monochromatic, and b) collinear:

a) Denote by $\lambda$ the wavelength of the radiation in the beam, by $\Delta\lambda$ the full spread in $\lambda$, and by $\lambda_0$ the average value of $\lambda$. Sufficient monochromaticity requires $$\text{a)}\quad \frac{\Delta\lambda}{\lambda_0} < f_1 \frac{1}{2}\,\frac{\lambda_0}{l_z}, \tag{1}$$

where $f_1$ is a suitably chosen constant (to be specified below).

b) Denote by $\Delta\theta_i$ the full angular width of the beam along the $i^{th}$ axis (i=x,y). Collinearity will be sufficient, provided that $$\Delta\theta_i < f_2^{\frac{1}{2}}\left(\frac{\lambda}{l_z}\right)^{\frac{1}{2}}, \quad i = x,y. \tag{2}$$

Here $f_2$ is a suitably chosen constant (which will be specified later).

c) Further conditions are imposed if one requires that the coherence diameters, $h_x$ and $h_y$, of the beam along the x and y axes, be larger than some specified lengths $l_x$ and $l_y$ respectively. Let $D_{si}$ stand for the diameter of the beam source along the i=x,y axis (and assume that the beam axis is aligned with z). Consider coherence diameters at a distance L from the source, and assume that the beam is narrow, i.e. $L >> D_{si}$, $L >> h_i$; i=x,y. Then the above requirement implies $$L > f_3 \frac{D_{si} l_i}{\lambda_0}, \quad i = x,y. \tag{3}$$

Here $f_3$ is a constant to be specified.

As customary, we refer to the cross sectional area, $A_\perp$, corresponding to the two coherence diameters $h_x$ and $h_y$, as the coherence area of the beam at a distance L from the source, and say that the coherence volume of the beam there is $h_z \cdot A_\perp$. The number of particles in the coherence volume is the coherence number (sometimes also referred to as the degeneracy number).

We introduce the following definitions: The "transversely coherent intensity", $I_\perp$, is the number of particles passing through $A_\perp$ per unit time. One can talk about instantaneous and average transversely coherent intensity. The transverse coherence number for a time interval $\Delta t$ is the number of particles passing through $A_\perp$, during $\Delta t$, i.e. $I_\perp \cdot \Delta t$. We denote the total particle beam intensity in the beam by I, and define the "degree of transverse coherence" or simply "transverse coherence", as $$C_\perp = I_\perp / I. \tag{4}$$

Evidently, $C_\perp \leqq 1$. The degree of transverse coherence is saturated when it reaches unity. At that point the transversely coherent intensity equals the total intensity, or, equivalently, the transverse coherence number for any $\Delta t$ equals the total number of particles passing through a cross sectional area of the beam, oriented normally to the beam axis, during $\Delta t$.

When conditions (1), (2) and (3) are satisfied, and when at the source all radiation is emitted in phase, then all radiation within a coherence volume $h_z \cdot A_\perp$ will be coherent, the exact degree of coherence depending on the constants $f_1$, $f_2$ and $f_3$.

In particular, when the distribution in wavelength, angle and point of emission are all uncorrelated, then difference between the phase of the radiation at any two points within the coherence volume will satisfy $$\Delta\phi < (f_1^2 + f_2^2 + f_3^2)^{\frac{1}{2}}\pi = f\pi. \tag{5}$$

ps The f is defined by the above equation. For sufficient coherence one usually requires $$f \leqq 0.25. \tag{5a}$$

Conversely, if radiation from various points within the source is emitted with random phases, it follows from the symmetry of conditions (1)-(3) under the interchange $l_i \rightarrow D_{si}$, (i=x, y), that one can perform interference experiments with such a source by allowing the beam to pass through two openings in a screen located in $A_\perp$, and observing the interference pattern behind the screen.

Given any photon beam, it is always possible to increase the coherence volume: Using monochromators one can increase monochromaticity; while passing the beam through appropriate slits can improve collinearity and decrease the effective source diameters. By contrast, neither the transversely coherent intensity nor the (transverse) coherence number can be increased in this manner: Monochromators and slits operate by discarding photons with undesirable frequencies, angles, or points of origin. Slits would not be needed if the photon source itself had small enough emittance. For storage rings, that generally requires the reduction of the electron beam emittance, and there are definite engineering limits which can not be crossed at the present time.

The method described here is capable of increasing the transverse coherence of the beam. In the limit it can saturate transverse beam coherence.

DESCRIPTION OF THE METHOD a) First, the full beam is focused to have an angular divergence which does not contradict conditions (2). Assume that the cross section of the beam so obtained violates condition (3).

b) Next, the beam is split into several component beams, altogether $N_c$ of them (FIG. 1). When the beam is an x-ray beam, this splitting can be accomplished by optical means. These beams all have cross sections consistent with inequality (3). If the full beam has radii $\sigma_{\gamma i}$, (i=x,y), then the $n^{th}$ component beam has radii $\sigma_{\gamma i}^{(n)} < \sigma_{\gamma i}$, n=1, . . . ,$N_c$. (See FIG. 1).

c) These component beams are allowed to travel along paths of different lengths to a common collection point $P_c$, so that they arrive there in sequence, "stacked" one after the other. (See FIG. 2).

Finally, at point $P_c$ a rotating mirror directs all component beams through a port to the user. (For x-ray beams the mirror can be a simple reflecting surface, a multilayer, a crystal, etc.) The reconstituted beam emerging through the port will thus have not only the required angular divergence, but also the required cross section. If needed, adequate monochromatization (at any stage of the process) will then lead to appropriate coherence.

As a result of this procedure, the beam will be transformed into a longer, but narrower one. When the beam cross section does not exceed the coherence area, then transverse coherence will be saturated, $C_\perp = 1$. Although the length of a pulse will increase, the longitudinal coherence length, $h_z$, will not be increased by the method. On the other hand, there are techniques by which the method can be supplemented to increase $h_z$. For example, longer undulators will cause an increase in $h_z$, if the electron beam quality is good enough.

A practical realization is shown in FIG. 6. In the case chosen here the decomposition pattern is one dimensional. There is no difference in principle between one and two dimensional decompositions, but the one dimensional case is easier to illustrate in a FIGURE such as this one. Furthermore, in many important cases one can reach complete coherence saturation by a one dimensional decomposition alone.

One can prove in general, that by static means alone, one can never achieve an increase in the transverse coherence of an entire beam (as opposed to only a segment of it). Therefore, $C_\perp$ can be increased only if at least one element of the beam optics is non-stationary. (S-1)

In FIG. 6 that element is a rotating mirror 640 designated by $M_r$.

After the beam multi-splitter at least one system of reflectors is needed to direct all beam components to $P_c$. It can be shown that the system of reflectors can not consist of only a single continuous mirror surface. (S-2)

Figure 8:
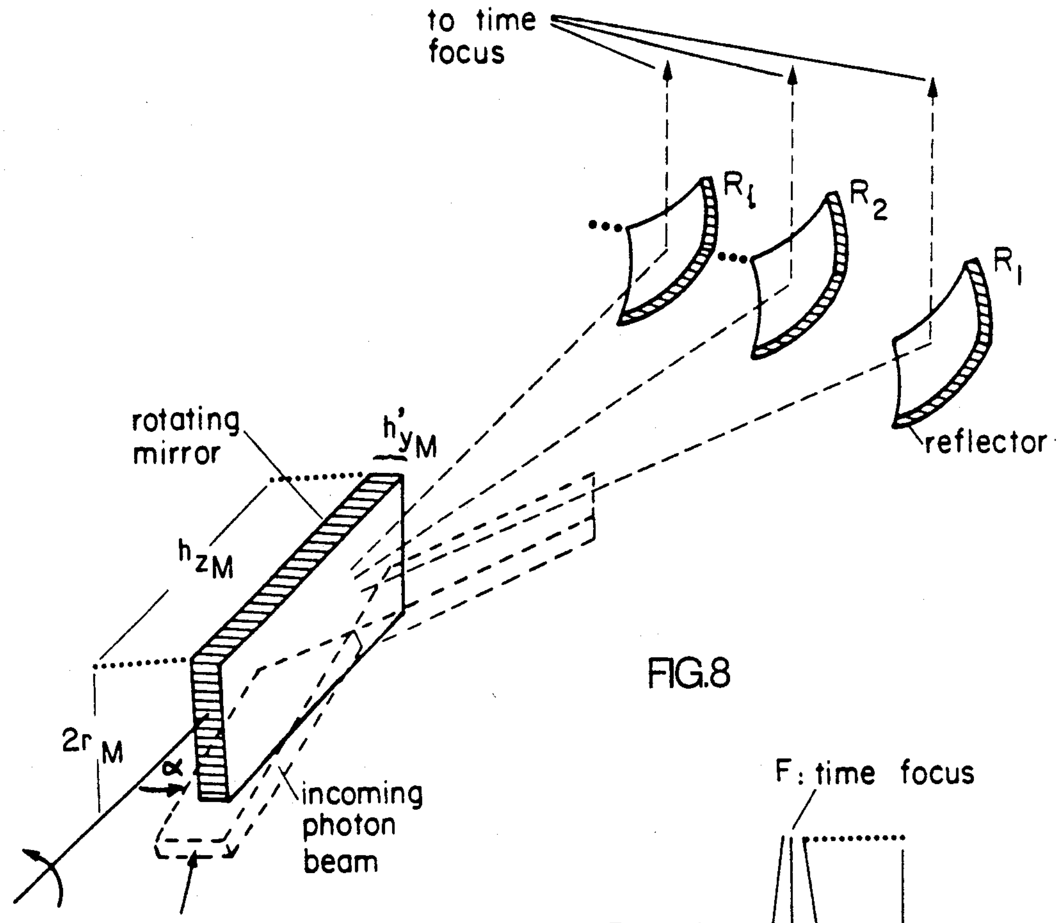
FIG. 8 is a perspective view of the reflectors and rotating mirror used in one embodiment of the invention.
Figure 9:
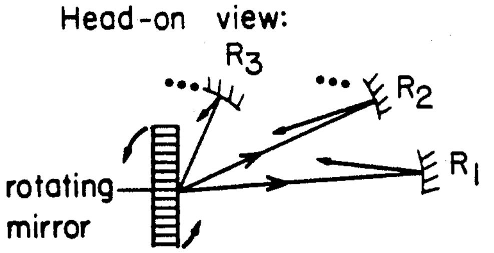
FIG. 9 is a side cross-sectional view of the reflectors and mirrors in FIG. 8.
Figure 14:
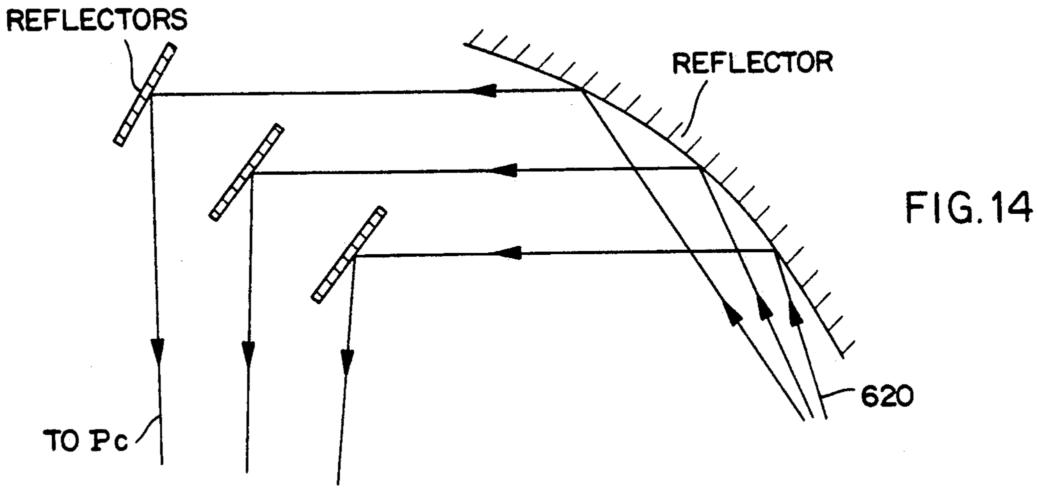
FIG. 14 is a schematic of part of one embodiment of the invention in which beam pulses are delayed with respect to each other by a set of static reflectors.
Figure 15:
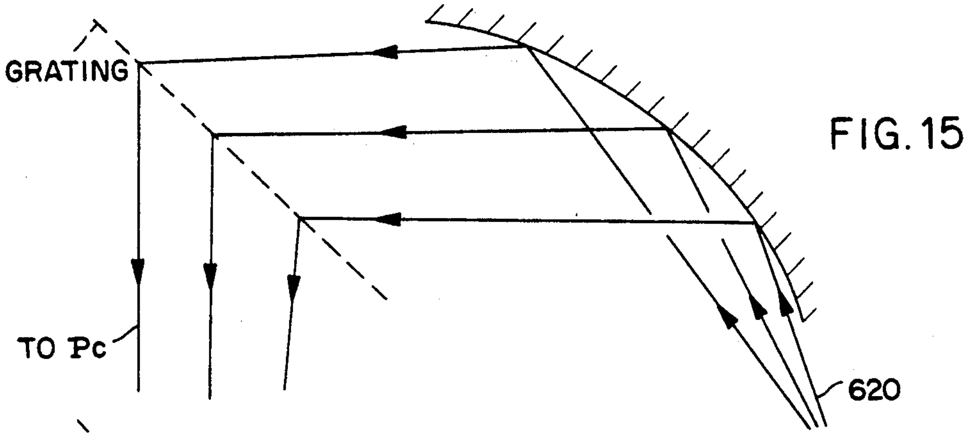
FIG. 15 is a schematic of part of one embodiment of the invention, in which beam pulses are delayed with respect to each other by a grating in conjunction with a set of one or more static reflector.
Figure 16:
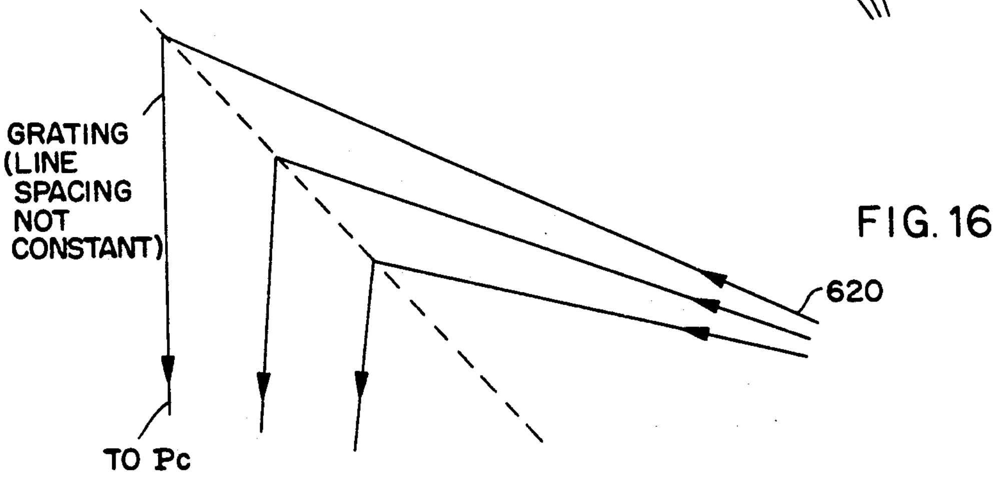
FIG. 16 is a schematic of part of one embodiment of the invention in which beam pulses are delayed with respect to each other by a grating on which the distance between neighboring lines depends on the position of the lines on the grating.

In FIG. 8 the system of reflectors, 630, consist of a sequence of disjoined mirrors, $R_i$, i=1,2, . . . ,$N_c$. Alternatively it may contain a grating structure or other equivalent discontinuous components, as illustrated in FIGS. 14, 15, and 16.

Let us denote the length of a component x-ray beam by $h_i$ (i=1, 2, . . . , $N_c$) so that it takes $\Delta 5_i = (1/c)\, h_j$ time for it to pass through any stationary optical element. To insure that each component beam will be clearly distinguished from every other one, it is necessary that the angular frequency of the rotating mirror by high enough:

$$\omega_M = \frac{1}{\Delta t_i}\left[\frac{\Delta}{2}\,\theta_\gamma + \frac{1}{l_{1i}}\,(r_M \cos\phi + r_{Ri} \cos{}_{Ri})\right] \tag{6}$$

$$i = 1, \ldots, N_c.$$

Figure 13:
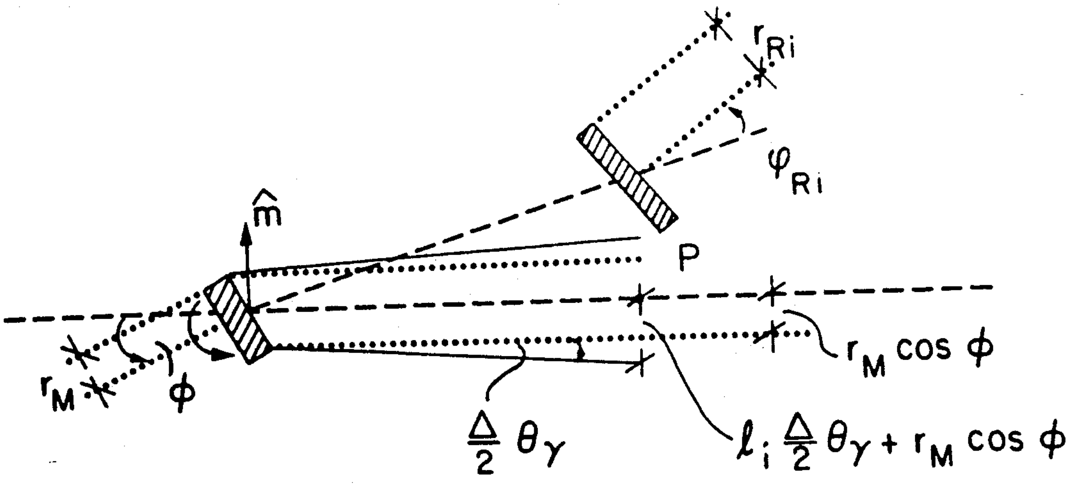
FIG. 13 is a cross-sectional view illustrating the relative position of a rotating mirror and a reflector.

Here $l_{1i}$ is the beam pathlength between $R_i$ and $M_r$. The $2r_M \cos\phi$ is the diameter of $M_4$ parallel to the unit vector $\hat{m}$. By definition, $\hat{m}$ is perpendicular to the projection of the axis of the beam reflected from $M_4$, onto a plane perpendicular to the axis of rotation of $M_4$ and is also perpendicular to the axis of rotation of $M_4$. (See FIG. 13).

The $2r_{Ri} \cos{}_{Ri}$ is the diameter projected onto $\hat{m}$, of $R_i$ when the beam reflected from $M_r$ hits $R_i$; the ${}_{Ri}$ is the angle of incidence of the beam on $R_i$, and the components of the reflector system 630 are denoted by $R_i$, i=1, . . . , $N_c$. The $\Delta\theta_\gamma$ is the full angular divergence of the reflected beam at $M_4$, in the plane containing $\hat{m}$. In Eq. (6) $l_{i1} >> r_M$, $r_{Ri}$ is assumed.

Let us denote by $f_c$ the factor by which the transverse coherence is increased as a result of coherence saturation. Then the time required to perform, e.g., a certain interference experiment will be reduced by this same factor. Large values of $f_c$ are desirable. In practice the maximum value of $f_c$ will be limited. One limitation on $f_c$ is related to the duty cycle, D, of the source. In designs such as the one shown in FIG. 6 one has to have $$f_c \leqq 1/D. \tag{7}$$

Since for high energy synchrotron sourced $D \leqq 10^{-3}$, very significant $f_c$ values can be achieved before one has to deal with this constraint.

Figure 12:
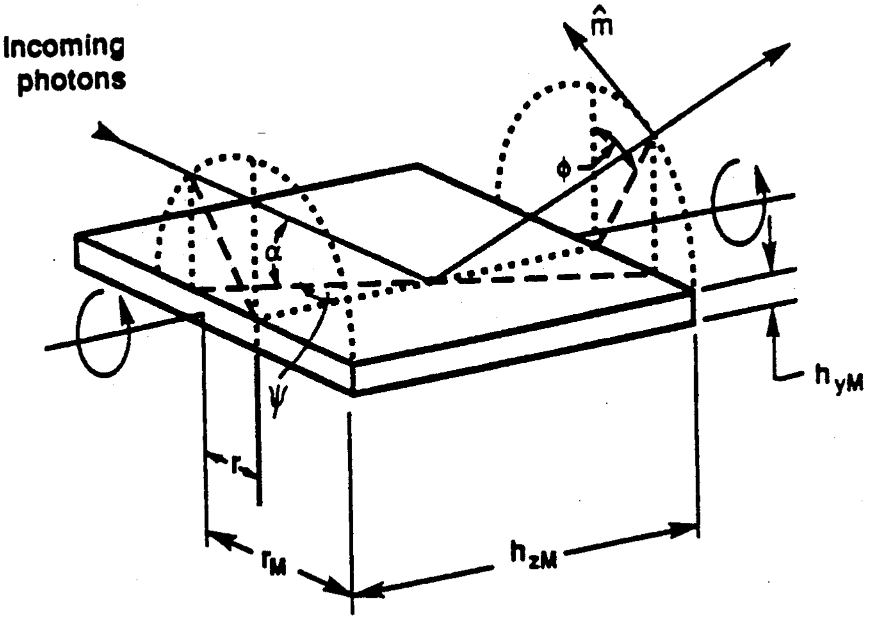
FIG. 12 is a perspective view of one facet of a rotating mirror.

Another limitation is imposed by the values of the angular velocity, $d\phi/dt = \omega$, that the rotating reflector element can achieve. To reach a certain $f_c$ value, the device must stack the $i^{th}$ component beam within the time $\Delta t_i$. Assuming that all component beams have equal length, i.e., $\Delta t_1 = \Delta t_2 = \ldots = \Delta t_{nc} = \Delta t$, one finds $\Delta t = T_p / f_c$, where $T_p$ is the time which elapses between the onset of any two successive photon pulses generated by the source. Referring to FIG. 12, denote by $r_M$ the radius of the rotating mirror 1200 and by $h_{zM}$ its length. Let $\sigma_{\gamma y}$ and $\sigma_{\gamma x}$ be the radius of the photon beam along the direction $\hat{m}$ and perpendicular to it, respectively. Assume that $\psi = 0$, and the rotating mirror is large enough to intercept the entire photon beam incident on it:

$$r_M \leqq \sigma_{\gamma y}, \tag{8a}$$

$$h_{ZM} \leqq 2\sigma_{\gamma x} / \sin \alpha_{min}. \tag{8b}$$

From Eq (6) one then finds that the rotating mirror perimeter moves with a velocity $$v(r_M) = r_M\omega_M > \frac{f_c}{T_p} r \frac{\Delta}{2} \theta_{\gamma y} \geqq \epsilon_{\gamma y} f_c/T_p. \quad (9)$$

Here $\epsilon_{\gamma y}$ is the emittance of the photon beam along the direction $\hat{m}$. On the other hand, the highest values $v(r_M)$ can reach are determined by the properties of the mirror material. For example, for uniform composition, denoting by $\rho$ and Y the density and tensile strength, respectively, $$v(r_M) < F_v\sqrt{Y/\rho}\ , \quad (10)$$

where $F_v$ is close to unity when $h_6 >> r_m$, referring to FIG. 12. Therefore, $$f_c < \frac{T_p}{\epsilon_{\gamma y}} F_v (Y/\rho)^{\frac{1}{2}}. \quad (11)$$

For high grade steel one finds $v(r_M) \leqq 6.10^4$ cm/s, so that when $\epsilon_{\gamma y} = 10^{-9}$ rad m, and $T_p = 10^{-6}$ s (similar to the values prevailing in synchrotrons), $f_c < 6.10^5$. This limit is generally even more remote than the previous one.

Figure 10:
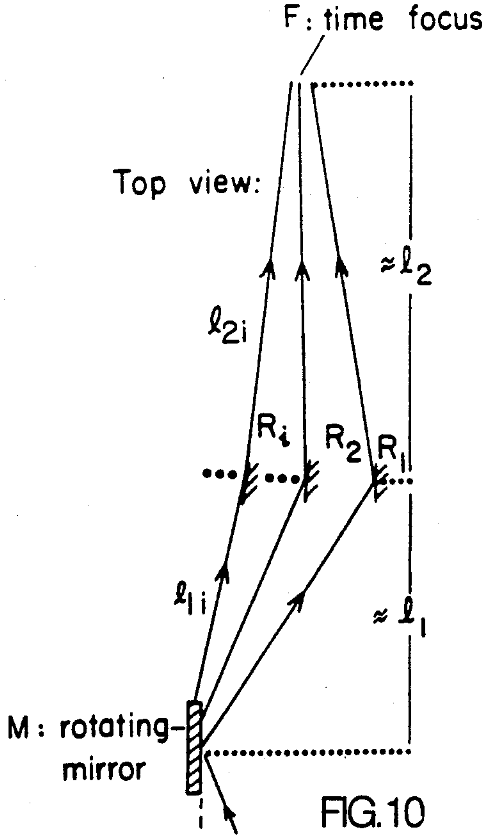
FIG. 10 is a top cross-sectional view of the reflectors and mirrors seen in FIG. 8.
Figure 11:
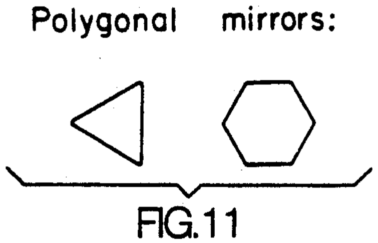
FIG. 11 is a side cross-sectional view of two rotating mirror geometries suitable for use in the invention.

A third restriction on $f_c$ derives from the fact that the maximum difference in pathlength traveled by the various component beams, $\Delta\iota_{max}$, is related to the total pathlength across the instrument. For example, in the geometry illustrated in FIG. 10, one has $$\Delta l_{max} \approx \tfrac{1}{2}\, l\alpha_{max}^2;\ l = l_1 + l_2, \quad (12)$$

where $\alpha_{max}$ is the maximum grazing angle of incidence. When one must have $\alpha_{max} << 1$, one is restricted to $\Delta\iota_{max} << \iota$. To achieve any particular $f_c$ value, one needs $$\Delta l_{max} \geqq f_c T_p D c, \quad (13)$$

if the length of the individual component beams are assumed to be all equal, i.e., have the value $cT_pD$. On the other hand, the beam optics must be so designed that the effective phase space occupied by the radiation is not significantly increased by random errors. In particular, the effect of random errors in angle, $\delta\theta$, due to mirror surface irregularities, should be small compared with the beam diameter. These effects have a value approximately equal to $\iota\delta\theta$, which requires $$\iota \leqq \sigma/\delta\theta, \quad (14)$$

and limits $\Delta\iota_{max}$. This limitation can be significant. If so, it can be dealt with as described below. If $\alpha_{max}$ need not be $<<1$, this restriction is far less severe, and at the same time $h_{zM}$ as given in Eq. (8b) can be reduced.

To evaluate the capabilities of the suggested approach, consider the SPEAR and PEP electron rings at Stanford. We assume that for SPEAR operating at circulating electron energy $E_e = 1.5$ GeV, the emittances are $\epsilon_x = 1.125\times10^{-7}$ rad m, and $\epsilon_y = 1.125\times10^{-9}$ rad m, and that in the region of photon generation the beta functions $\beta_x{}^I = 90$ cm and $\beta_y{}^I = 8$ cm; while for PEP operating at 4.5 GeV, $\epsilon_x = 1.05\times10^{-8}$ rad m, $\epsilon_6 = 1.05\times10^{-10}$ rad m, $\beta_x{}^* = 300$ cm, and $\beta_y{}^* = 40$ cm. From these the photon beam emittances, $\epsilon_{\gamma x}$ and $\epsilon_{\gamma y}$, can be calculated at the source for both machines. The halflength of the electron bunches will be taken to be $\sigma_{zo} = 5$ cm for SPEAR, and 1.5 cm for PEP. These then are also the halflengths, $\sigma_{\gamma zo}$, of the respective photon beam pulses generated.

Table I lists the calculated values $\epsilon_{\gamma x}$ and $\epsilon_{\gamma y}$ for both machines for photons with energy $E_\gamma$; the coherence enhancement factor, $f_c$; the total length of the reconstructed resultant photon pulse $L_p$; the perimeter velocity of the rotating mirror $v(r_m)p$ as well as $(\frac{1}{2})\ \Delta\theta_{\gamma y}$, $r_M$, $h_z$ and $\alpha$. The approximate length of the total optical path through the device can be estimated from $\iota \geqq 2L_p\alpha^2$ when $\alpha << 1$, only the trivial condition $\iota \geqq L_p$ remains.

The procedure described previously and illustrated in FIG. 1 is well suited to explain the principle of coherence saturation. However, if $\alpha << 1$, and the limitation of $\iota$ as discussed in connection with Eqs. 12 and 14 presents a problem, the design can be modified. In that case, rather than starting with a small $(\Delta/2)\ \theta_{\gamma y}$, it is preferred to first focus the beam with $(\Delta/2)\ \theta_{\gamma y}$ sufficiently large compared to the random $\delta\theta$, so that the effect of the latter should become negligible. One pays for that either by having to deal with a significantly larger diameter beam later on, or by having to refocus the beam at least once before it reaches the rotating mirror. With a subsequent refocusing $(\frac{1}{2})\ \delta\theta_{\gamma y}$ can eventually be reduced to its desired value. An alternative strategy which may be used in combination with the one just described, consists of decomposing the original beam in more than one step. In the first step each of the component beams are allowed to occupy a relatively large transverse phase space, large enough so that the relative increase caused by the random $\delta\theta$ is sufficiently small. In this step large $\Delta\iota_1$ can be induced, and in addition a certain $\Delta\iota_2$ space is left between successive component beams to allow the second step to take place. In the second step each component beam is considered to be the original beam, and further decomposed into subcomponent beams. In the second step it is sufficient to introduce $\Delta\iota_2$ difference in the optical path. When $\Delta\iota_2 << \Delta\iota_1$, the benefits of this strategy become significant. One can also decompose the beam in more than two steps.

In principle, the method proposed here can be used in conjunction with any noncoherent photon source. However, it should prove most immediately valuable when a) the photons are expensive to generate,
b) the photon duty cycle is low,
c) the photon intensity is one of the principal limiting factors in the experiment.

For high energy electron synchrotron radiation sources both a) and b) hold, and for interference experiments c) is also true. Therefore, coherence saturation should prove to be particularly valuable technique for such interference x-ray experiments.

When the transverse coherence of a radiation beam pulse is increased by the method here described, the emittance of the beam along at least one transverse direction will be reduced in the process. That emittance reduction is often useful, even if it is not intended to use the beam in interference experiments. For example, it is sometimes desired to compress the length of a radiation pulse, in other words, it is desired to have substantially all of the radiation in the pulse arrive at a surface S during a time interval δt which is shorter than the time duration, $DT_p$, of the original pulse. Here S is assumed to be oriented substantially perpendicular to the axis of the beam pulse impinging on it.

It is shown in the cited "Equitemporal X-Ray Optics" by Csonka 1986, that such length compression of a pulse can be achieved by dynamical optical means, i.e. when at least one optical element of the beam optics is non-stationary. Once the maximum speed of the moving optical element is given, the smallest δt which can be accomplished by the method depends only on the emittance of the beam pulse whose length is to be compressed: δt is smaller, if the emittance of the pulse is smaller along a chosen transverse direction. It is permissible to chose that transverse direction to be that along which the emittance is smallest. Therefore, smaller δt can be achieved, if the emittance along at least one transverse direction is reduced.

One can reduce the emittance by splitting the beam pulse into several components, and compressing the length of each component. That implies the complication of compressing several beam pulses. Alternatively, one may employ optical means to reduce the emittance along one transverse direction, while increasing the emittance along another transverse direction, which generally implies an increase of the beam diameter along the latter direction. That increase requires, in turn, larger moving optical elements, if the entire beam is to be compressed. At high speeds larger optical elements are more susceptible to instabilities. A third alternative, which may be used in conjunction with either or both of the above two, consists of decreasing the emittance along at lest one transverse direction while increasing the pulse length. Such is the case when transverse coherence is being increased by the method here described. Although the total pulselength is allowed to increase, the final achievable δt will be smaller than for the original radiation pulse.

The foregoing description of a preferred embodiment of the invention has been presented for purposes of illustration and description. It is not intended to be exhaustive or to limit the invention to the form disclosed, and, obviously, many modifications and variations are possible in light of the above teaching. It is intended that the scope of the invention be defined by the claims appended hereto.

I claim:

1. A method for improving the coherence of a pulse of X-ray radiation comprising the steps of: longitudinally splitting said pulse into a plurality of pulses;

delaying at least one of said pulses with respect to at least one other of said pulses; and combining said pulses in serial fashion to form a output beam longer than said pulse.

2. The method of claim 1, wherein delaying is accomplished by using static reflectors.

3. The method of claim 1, wherein delaying is accomplished by using a grating in conjunction with one or more static reflectors.

4. The method of claim 1, wherein combining is accomplished by using a rotating mirror.

* * * * *